United States Patent
Kim et al.

(10) Patent No.: US 8,327,148 B2
(45) Date of Patent: Dec. 4, 2012

(54) MOBILE SYSTEM, SERVICE SYSTEM, AND KEY AUTHENTICATION METHOD TO MANAGE KEY IN LOCAL WIRELESS COMMUNICATION

(75) Inventors: Eunah Kim, Seoul (KR); Jeong Hyun Yi, Daejeon-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 12/425,412

(22) Filed: Apr. 17, 2009

(65) Prior Publication Data
US 2010/0131763 A1    May 27, 2010

(30) Foreign Application Priority Data
Nov. 27, 2008    (KR) .................. 10-2008-0118898

(51) Int. Cl.
H04L 9/32    (2006.01)

(52) U.S. Cl. ........ 713/176; 713/171; 713/181; 380/247; 380/277

(58) Field of Classification Search .................. 713/171, 713/168, 176, 181; 380/277, 247
See application file for complete search history.

(56) References Cited

U.S. PATENT DOCUMENTS

| | | | |
|---|---|---|---|
| 7,055,029 B2 * | 5/2006 | Collins et al. | 713/161 |
| 7,137,016 B2 * | 11/2006 | Nalawadi et al. | 713/300 |
| 2003/0065941 A1 * | 4/2003 | Ballard et al. | 713/201 |
| 2004/0111601 A1 | 6/2004 | Racz | |
| 2004/0162937 A1 | 8/2004 | Hatsch et al. | |
| 2005/0132182 A1 * | 6/2005 | Challener et al. | 713/150 |
| 2005/0235145 A1 * | 10/2005 | Slick et al. | 713/165 |
| 2007/0136800 A1 * | 6/2007 | Chan et al. | 726/10 |
| 2009/0172639 A1 * | 7/2009 | Natu et al. | 717/120 |
| 2011/0185173 A1 * | 7/2011 | Liu | 713/168 |

FOREIGN PATENT DOCUMENTS

| | | |
|---|---|---|
| JP | 2000-354031 | 12/2000 |
| JP | 2006-304199 | 11/2006 |
| KR | 10-2004-0075359 | 8/2004 |
| KR | 10-0608604 B1 | 8/2006 |
| KR | 10-2007-0018242 | 2/2007 |
| KR | 10-2008-0077500 | 8/2008 |

OTHER PUBLICATIONS

See Japanese publication No. JP 2000-354031, Date of Publication Dec. 19, 2000, Abstract is provided with IDS, this is the machine translation of the specification/Claims.*
Korean Office Action Issued Jul. 30, 2010, in counterpart Korean Application No. 10-2008-0118898 (3 pages).

* cited by examiner

*Primary Examiner* — Samson Lemma
(74) *Attorney, Agent, or Firm* — NSIP Law

(57) ABSTRACT

A mobile system, a service system, and a key authentication method to manage a key in a local wireless communication are provided. The mobile system and the service system may generate a hash value with respect to a public key of the service system using an identical hash function, and output a result corresponding to the hash value.

18 Claims, 5 Drawing Sheets

MOBILE SYSTEM, SERVICE SYSTEM, AND KEY AUTHENTICATION METHOD TO MANAGE KEY IN LOCAL WIRELESS COMMUNICATION

CROSS-REFERENCE TO RELATED APPLICATION

This application claims the benefit under 35 U.S.C. §119 (a) of a Korean Patent Application No. 10-2008-0118898, filed on Nov. 27, 2008, in the Korean Intellectual Property Office, the entire disclosure of which is incorporated herein by reference.

BACKGROUND

1. Field

The following description relates to a mobile service system to manage a key in a local wireless communication, service system, and a key authentication method.

2. Description of Related Art

It is inefficient to use a centralized infrastructure or to store either public keys of all peripheral devices or certifications of all peripheral devices in a local wireless communication environment in which communication occurs with mobility for short periods of times and frequently. Therefore, a more efficient key managing method may be advantageous for improving the mobility and portability of a mobile environment.

SUMMARY

In one general aspect, there is provided a mobile system, service system, and a key authentication method that may exchange a key without using an external network, an external trusted authority, predetermined key information, and the like, by respectively outputting a result corresponding to a hash value according to a determined output-mode.

In another general aspect, there is provided a mobile system, a service system, and a key authentication system that may enable a user who does not have knowledge about a method to manage a key using information respectively outputted from the mobile system and the service system to easily and reliably set a wireless communication session.

In still another general aspect, there is provided a mobile system including a pubic key receiver to receive a public key from a service system, a hash value generator to generate a hash value with respect to the received public key using a predetermined hash function, and an output unit to output a result corresponding to the hash value. The service system may output the result corresponding to the hash value of the public key, the hash value being generated using the predetermined hash function.

The output unit may include a converter to convert the hash value into text data according to a predetermined rule and a display unit to display the converted text data.

The system may further include an output-mode determining unit, wherein the output unit outputs the result according to a determined output-mode, and displays information on a display unit with respect to the output-mode of the service system.

The system may further include a session key generator to generate a session key where an acknowledgment signal is received in response to the result, an encrypting unit to encrypt the session key using the public key, and a session key transmitter to transmit the encrypted session key to the service system.

The public key receiver may further receive a signature data with respect to the public key along with the public key, and the mobile system may further include a public key authenticating unit to verify the signature data to authenticate the public key. The signature data may be generated by encrypting the public key using a private key in the service system, and the public key authenticating unit may decrypt the signature data using the public key and compare the decrypted signature data with the public key to authenticate the public key.

In still another general aspect, there is provided a service system including a key generator to generate a public key and a private key pair, a public key transmitting unit to transmit the public key in response to a request from a mobile system, a hash value generating unit to generate a hash value with respect to the public key using a predetermined hash function, and an output unit to output a result corresponding to the hash value. The mobile system may output the result corresponding to the hash value of the public key, the hash value being generated using the predetermined hash function.

The output unit may include a converting unit to convert the hash value into text data according to a predetermined rule, and a display unit to display the converted text data.

The service system may further include an output-mode determining unit to determine an output-mode of the mobile system and an output-mode of the result, wherein the output unit outputs the result according to the determined output-mode and displays information on a display unit with respect to the output-mode of the mobile system.

The system may further include a session key receiving unit to receive an encrypted session key from the mobile system after ascertaining that an acknowledgment signal is inputted in response to the result, and a decrypting unit to decrypt the encrypted session key using the private key.

The system may further include a signature data generating unit to generate signature data by encrypting the public key using the private key, wherein the public key transmitting unit transmits the signature data to the mobile system along with the public key.

The public key may be authenticated by comparing the public key with a decrypted signature data decrypted using the public key.

In still another general aspect, there is provided a method for authenticating a key, the method including receiving a public key from a service system, generating a hash value with respect to the received public key using a predetermined hash function, and outputting a result corresponding to the hash value. The service system may output the result corresponding to the hash value of the public key, the hash function being generated using the predetermined hash function.

The outputting of the result may include converting the hash value into text data according to a predetermined rule, and displaying the converted text data.

The method may further include determining an output-mode of the service system and the output-mode of the result, wherein the outputting of the result comprises outputting the result according to the determined output-mode, and displaying information with respect to the output-mode of the service system.

The method may further include generating a session key when an acknowledgment signal is inputted in response to the result, encrypting the session key using the public key, and transmitting the encrypted session key to the service system.

The receiving of the public key may include receiving a signature data with respect to the public key, and authenticating the public key by verifying the signature data.

The signature data may be generated by encrypting the public key using a private key in the service system, and the authenticating of the public key authenticates the public key by decrypting the signature data using the public key and comparing the public key with the decrypted signature data.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
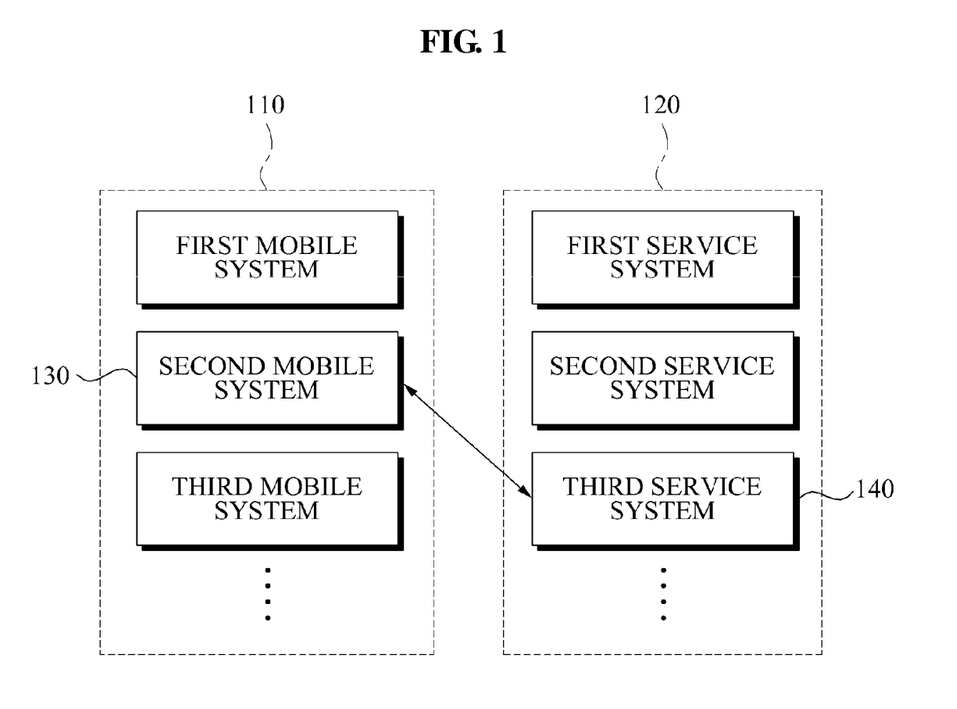
FIG. 1 is a diagram illustrating an exemplary configuration of a mobile system and service system.

FIG. 1 illustrates an exemplary configuration of a mobile system and a service system. A first dotted-line box 110 indicates mobile systems, and a second dotted-line box 120 indicates service systems. The mobile systems may communicate with the service systems to transmit user data used for a service that is provided by the service systems.

Here, a device that includes a storage medium and is able to perform communications may be used as a mobile system. Also, a device that is able to communicate with the mobile system and is able to provide a predetermined service may be used as a service system. For example, as the mobile system, a device that has mobility and portability and includes a storage medium and communication function, such as a portable phone, a personal digital assistant (PDA), a notebook, or a MP3 or MD player which are able to perform local wireless communication, may be used. Also, in addition to the portable phone, the PDA, the notebook, and the like, a device that is able to communicate with the mobile system and is able to provide a predetermined service even though the device may not have mobility or portability, such as a PC and a server, may be used as the service system 120. As an example, a second mobile system 130 may be a portable phone that stores credit card information as the user data, and a third service system 140 may be a terminal that provides payment service for a product displayed in a supermarket and the like.

To manage a key between the mobile system and the service system, the mobile system may need to authenticate a public key received from the service system. To achieve this, the mobile system and the service system may respectively generate a hash value with respect to the public key using an identical hash function, respectively output a result corresponding to the hash value, and compare the respectively outputted result to authenticate the public key.

Figure 2:
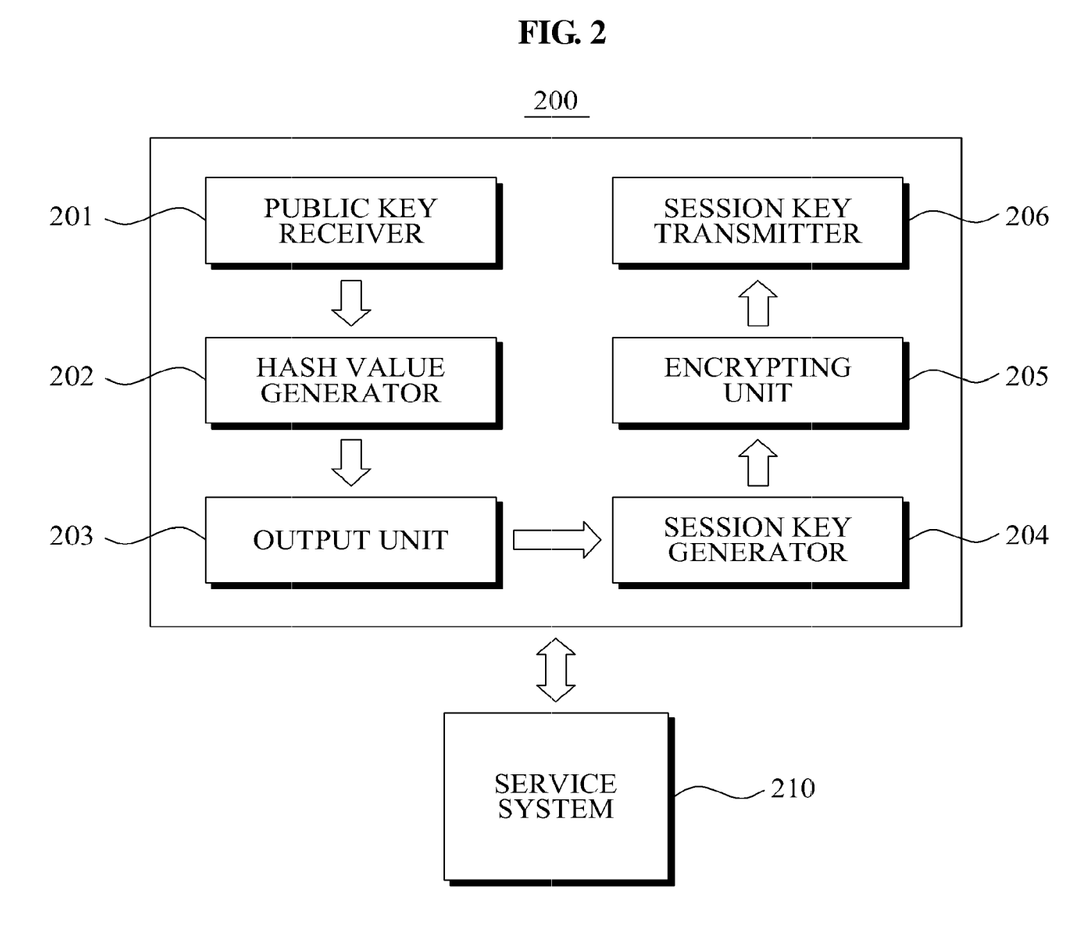
FIG. 2 is a diagram illustrating an exemplary internal configuration of a mobile system.

FIG. 2 illustrates an exemplary internal configuration of a mobile system 200. The mobile system 200 includes a public key receiver 201, a hash value generator 202, an output unit 203, a session key generator 204, an encrypting unit 205, and a session key transmitter 206.

The public key receiver 201 may receive a public key from a service system 210. Here, the public key receiver 201 may further receive signature data with respect to the public key together with the public key, and in this case, the mobile system 200 may further include a public key authorizing unit (not illustrated) that may verify the signature data to authenticate the public key. Here, the signature data may be generated by encrypting the public key using a private key in the service system 210, and may be authenticated by comparing the decrypted signature data with the public key.

For example, the service system 210 may generate and maintain a public key and a private key pair, and transmit the public key and the signature data that is generated by encrypting the public key using the private key to the mobile system 200 at the request of the mobile system 200. The public key receiver 201 may receive the public key and the signature data, and decrypt the signature data using the public key to compare the decrypted signature data with the public key, thereby determining that the public key is received from the service system 210.

The hash value generator 202 may receive a hash value with respect to the received public key using a predetermined hash function. The hash value generator 202 may generate a result calculated by applying a string of the public key to the hash function, as the hash value. The hash value generator 202 may use the predetermined hash function as the hash function so as to use a hash function identical with a hash function of the service system 210.

The output unit 203 may output a result corresponding to the hash value. The service system 210 may output a result corresponding to a hash value of the public key, the hash value being generated using the predetermined hash function. For example, the mobile system 200 and the service system 210 may obtain an identical result corresponding to a hash value that is generated by applying an identical public key to the identical hash function, using the hash value. In response to the string value of the public key being changed by a "Man-in-middle" or similar attack, or a different public key being received, the mobile system 200 and the service system 210 may obtain different results corresponding to the hash value. The mobile system and the service system 210 may respectively output their result via a variety of modes, and thereby authenticating the public key between the mobile system 200 and the service system 210.

As one example, the output unit 203 may include a converter (not illustrated) to convert the hash value into text data according to a predetermined rule and a display unit (not illustrated) to display the converted text data. The service system 210 may also convert the hash value into the text data according to the identical rule and display the converted text data. A user may check the text data respectively displayed in the mobile system 200 and the service system 210, and thereby may determine that the public key of the service system 210 is reliably received by the mobile system 200.

The mobile system 200 may further include an output-mode determining unit (not illustrated) that determines an output-mode of the service system 210 and an output-mode of the result, and the output unit 203 may output the result according to the determined output-mode and display information with respect to the output-mode of the service system 210. The mobile system 200 may output the result as sound, and may display information that the service system 210 may use an output-mode for outputting text data. In response to the service system 210 outputting text data substantially perfectly, it is determined that the public key is reliably received by the mobile system 200.

The session key generator 204 generates a session key where an acknowledgment signal is received in response to the outputted result. The mobile system 200 may output the result and concurrently display an image which is used for receiving the acknowledgment signal from a user, and thereby may receive the acknowledgment signal through a predetermined button. The session key generator 204 may generate a session key which is used for data transmission with the service system 210.

The encryption unit 205 encrypts the session key using the public key, and the session key transmitter 206 transmits the encrypted session key to the service system 210. The service system 210 decrypts the received encrypted session key using a private key corresponding to the public key, and thereby may obtain the session key. That is, an identical session key is set between the mobile system 200 and the service system 210, and data transmission is reliably performed using the session key.

Figure 3:
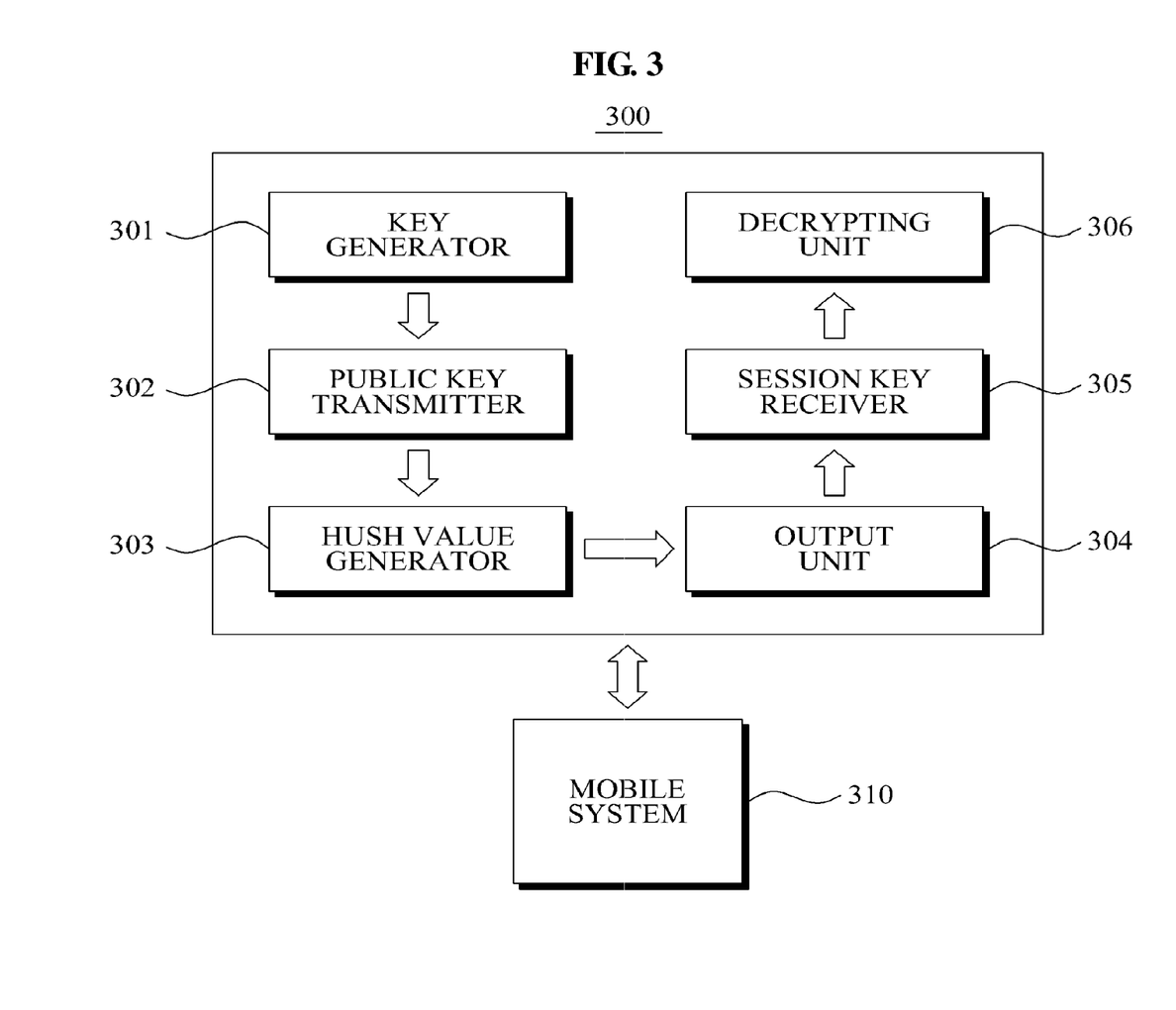
FIG. 3 is a diagram illustrating an exemplary internal configuration of a service system.

FIG. 3 illustrates an exemplary internal configuration of a service system 300. The service system 300 includes a key generator 301, a public key transmitter 302, a hash value generator 303, an output unit 305, a session key receiver, and a decrypting unit 306.

The key generator 301 generates a public key and a private key pair. The once generated public key and private key pair may be stored and maintained in a storage space of the service system 300.

The public key transmitter 302 transmits the public key in response to a request from the mobile system 310. The service system 300 may further include a signature data generator (not illustrated) that encrypts the public key using the private key to generate signature data. The public key transmitter 302 may further transmit the signature data to the mobile system 310 together with the public key. The mobile system 310 decrypts the signature data using the public key to compare the decrypted signature data with the public key, and thereby the public key is authenticated in the mobile system 310. That is, where the signature data decrypted using the public key and the public key are identical to each other, the mobile system 310 may determine that the public key is received from the service system 300.

The hash value generator 303 generates a hash value with respect to the public key using a predetermined hash function. The hash value generator 303 may generate a result calculated by applying a string of the public key to the hash function, as the hash value. Also, the hash value generator 303 may use the predetermined hash function as the hash function so as to use a hash function identical with a hash function of the mobile system 310.

The output unit 304 outputs a result corresponding to the hash value. The mobile system 310 outputs a result corresponding to a hash value of the public key, the hash value being generated using the predetermined hash function. For example, the mobile system 310 and the service system 300 may obtain an identical result corresponding to a hash value that is generated by applying an identical public key to the identical hash function, using the hash value. In response to the string value of the public key being changed by a "Man-in-middle" or similar attack, or a different public key being received, the mobile system 310 and the service system 300 may obtain different results corresponding to the hash value.

The mobile system 310 and the service system 300 may respectively output their result via a variety of modes, and thereby authenticate the public key between the mobile system 310 and the service system 300.

As one example, the output unit 304 may include a converter (not illustrated) to convert the hash value into text data according to a predetermined rule and a display unit (not illustrated) to display the converted text data. The mobile system 310 also may convert the hash value into the text data according to the identical rule and display the converted text data. A user may check the text data respectively displayed in the service system 300 and the mobile system 310, and thereby may determine that the public key of the service system 300 is reliably received by the mobile system 310.

The service system 300 may further include an output-mode determining unit (not illustrated) that determines an output-mode of the mobile system 310 and an output-mode of the result, and the output unit 304 may output the result according to the determined output-mode and display information with respect to the output-mode of the mobile system 310. For example, the service system 300 may output the result as text data, and may display information that the mobile system 310 may use an output-mode that performs outputting using light. In response to the mobile system 310 outputting the result using light, it is determined that the public key is reliably received by the mobile system 310.

The session key generator 305 receives an encrypted session key from the mobile system 310 where an acknowledgment signal is received in response to the outputted result, and the decrypting unit 306 decrypts the encrypted session key using the private key.

The service system 300 may output the result, and concurrently display an image which is used for receiving the acknowledgment signal from a user, and thereby may receive the acknowledgment signal through a predetermined button. The session key generator 305 may receive a session key which is used for data transmission with the mobile system 310, through the mobile system 310. That is, the service system 300 decrypts the received encrypted session key using a private key corresponding to the public key, and thereby may obtain the session key. Accordingly, an identical session key is set between the mobile system 310 and the service system 300, and thus, data transmission is reliably performed using the session key.

Figure 4:
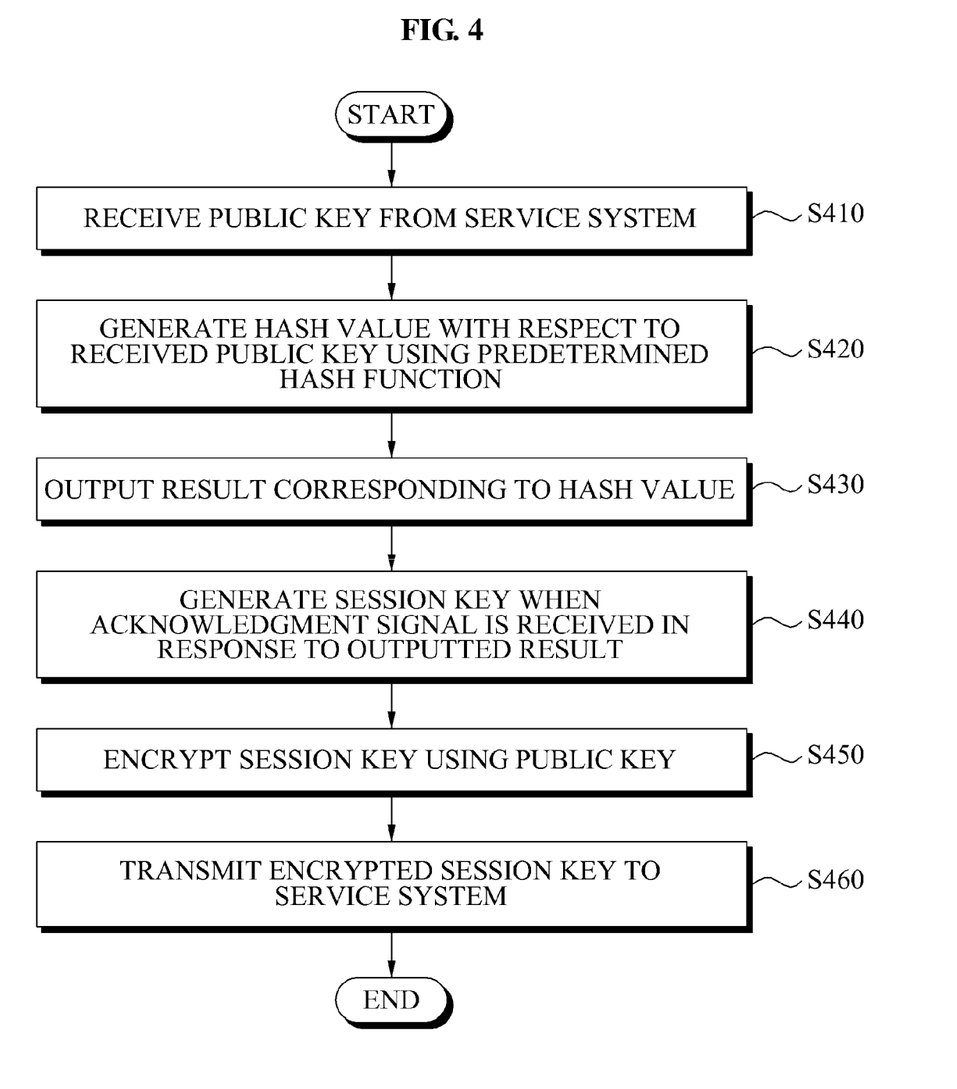
FIG. 4 is a flowchart illustrating an exemplary key authentication method.

FIG. 4 is a flowchart illustrating an exemplary key authentication method. The key authentication method may be performed using the mobile system 200 of FIG. 2. Hereinafter, a process of performing each operation in the mobile system 200 and the key authentication method will be described.

In operation S410, the mobile system 200 receives the public key from the service system 210. In this case, the mobile system 200 may further receive signature data with respect to the public key together with the public key, and the mobile system 200 may further include a public key authentication (not illustrated) that verifies the signature data to authenticate the public key. Here, the signature data may be generated by encrypting the public key using a private key in the service system 210, and the public key authentication unit may decrypt the signature data using the public key and compare the decrypted signature data with the public key data to authenticate the public key.

For example, the service system 210 may generate and maintain a public key and a private key pair, and transmit the public key and the signature data which is generated by encrypting the public key using the private key to the mobile system 200. The mobile system 200 may receive the public key and the signature data, and decrypt the signature data using the public key to compare with the public key. Accordingly, it may be determined that the public key is received from the service system 210.

In operation S420, the mobile system 200 generates a hash value with respect to the received public key using a predetermined hash function. The mobile system 200 may generate a result calculated by applying a string of the public key to the hash function, as the hash value. The mobile system 200 may use the predetermined hash function as the hash function so as to use a hash function identical to a hash function of the service system 210.

In operation S430, the mobile system 200 outputs a result corresponding to the hash value. The service system 210 outputs a result corresponding to a hash value of the public key, the hash value being generated using the predetermined hash function. For example, the mobile system 200 and the service system 210 may obtain an identical result corresponding to the hash value that is generated by applying an identical public key to the identical hash function, using the hash value. In response to the string value of the public key being changed by a "Man-in-the-middle" or similar attack, or a different public key being received, the mobile system 200 and the service system 210 may obtain different results corresponding to the hash value. The mobile system 200 and the service system may respectively output their result via a variety of modes, and thereby authenticating the public key between the mobile system 200 and the service system 210.

The mobile system 200 may convert the hash value into text data according to a predetermined rule and display the converted text data. The service system 210 also may convert the hash value into the text data according to the identical rule and display the converted text data. A user may check the text data respectively displayed in the mobile system 200 and the service system 210, and thereby may determine that the public key of the service system 210 is reliably received by the mobile system 200.

The mobile system 200 may further determine an output-mode of the service system 210 and an output-mode of the result, and the mobile system 200 may output the result according to the determined output-mode and display information with respect to the output-mode of the service system 210. The mobile system 200 may output the result as sound, and may display information that the service system 210 may use an output-mode of outputting text data. In response to the service system 210 outputting text data substantially perfectly, it is determined that the public key is reliably received by the mobile system 200.

In operation S440, the mobile system 200 generates a session key where an acknowledgment signal is received in response to the outputted result. The mobile system 200 may output the result, and concurrently display an image which is used for receiving the acknowledgment signal from a user, and thereby may receive the acknowledgment signal through a predetermined button. Also, the mobile system 200 may generate a session key which is used for data transmission with the service system 210.

The mobile system 200 encrypts the session key using the public key in operation S450, and transmits the encrypted session key to the service system 210 in operation S460. In this case, the service system 210 decrypts the received encrypted session key using a private key corresponding to the public key, and thereby may obtain the session key. That is, an identical session key is set between the mobile system 200 and the service system 210, and data transmission is reliably performed using the session key.

Figure 5:
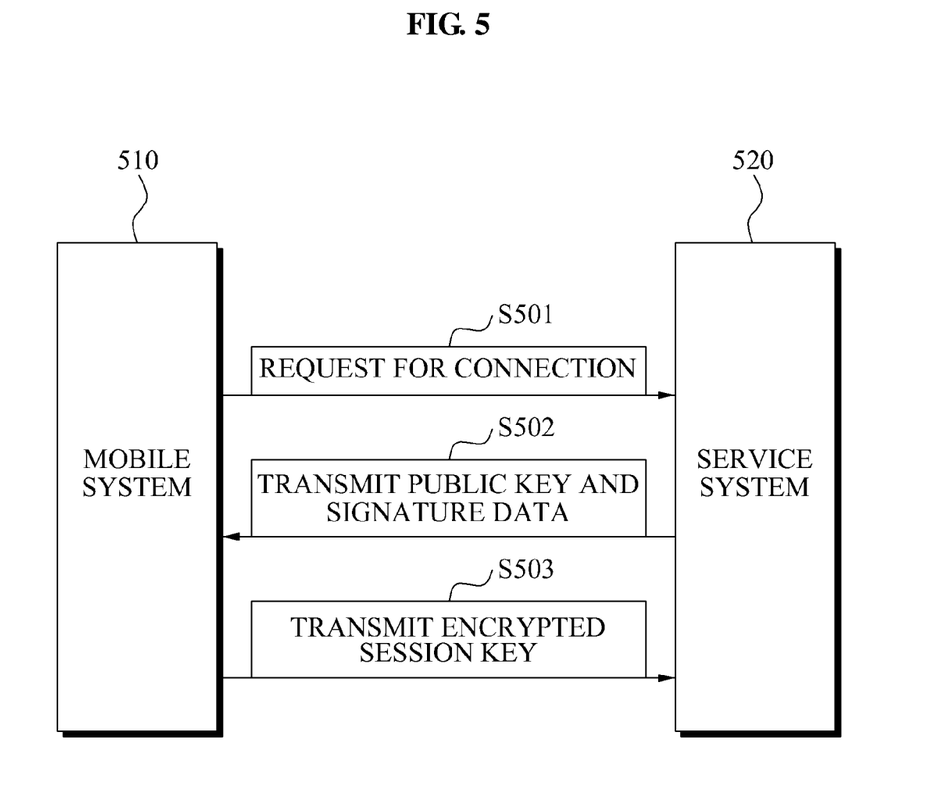
FIG. 5 is a diagram illustrating an exemplary key authentication method using a mobile system and a service system.

FIG. 5 illustrates an exemplary key authentication method using a mobile system 510 and a service system 520. Hereinafter, a process of determining reliable receipt of a public key between the mobile system 510 and the service system 520 and a process of setting a session key using the public key will be described. The mobile system 510 and the service system 520 may correspond to a mobile system and a service system described above with respect to FIGS. 2 and 3.

First, the service system 520 generates and stores a public key and a private key pair. In response to the mobile system 510 requesting a connection to the service system 520, the service system 520 generates signature data of the public key and transmits the public key and the signature data to the mobile system 510 in operation S502. The signature data may be generated by encrypting the public key using the private key. The mobile system 510 may decrypt the signature data using the public key to compare the decrypted signature data with the public key, and thereby determine that the public key is reliably received from the service system 520, as opposed to being received from a different arbitrator system.

The mobile system 510 and the service system 520 may respectively generate a hash value by applying the public key to an identical hash function and respectively output a result corresponding to the hash value, and thereby authenticating the public key. A process of comparing the outputted results will be omitted since it is described above in reference to FIGS. 2 through 4.

In response to the public key being authenticated, the mobile system 510 generates a session key and encrypts the session key using the public key to transmit to the service system 520. Also, the service system 520 decrypts the encrypted session key using its own private key, and thereby obtaining the session key. That is, the session between the mobile system 510 and the service system 520 is set, and data transmission is reliably performed using the session key.

The mobile system, the service system, and the key authentication method according to the examples may enable exchanging a key without using an external network, a third party trusted authority, a predetermined key information, and the like, by respectively outputting a result corresponding to a hash value according to a determined output-mode, and may also enable a user who does not have knowledge about a method for managing a key using information respectively outputted from the mobile system and the service system to easily and reliably set a wireless communication session.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile system to perform authentication with a service system in which the mobile system and the service system output a result of the authentication, the mobile system comprising:
   a public key receiver to receive a public key from the service system;
   a hash value generator to generate a first hash value with respect to the received public key, using a predetermined hash function; and
   an output device to output a first result corresponding to the first hash value,
   wherein a second hash value with respect to the public key of service system is generated in the service system and a second result corresponding to the second hash value is outputted in the service system, and
   the public key is authenticated by a user of the mobile system based on a comparison between the first result and the second result.

2. The system of claim 1, wherein the output device comprises:
   a converter to convert the first hash value into text data according to a predetermined rule; and
   a display unit to display the converted text data.

3. The system of claim 1, further comprising:
   an output-mode determining unit to determine an output-mode of the service system from among a plurality of output modes,
   wherein the output device outputs the first result according to the determined output-mode, and displays information on a display unit with respect to the output-mode of the service system.

4. The system of claim 1, further comprising:
   a session key generator to generate a session key when an acknowledgment signal is received in response to the first result;
   an encrypting unit to encrypt the session key using the public key; and
   a session key transmitter to transmit the encrypted session key to the service system.

5. The system of claim 1, wherein the public key receiver further receives a signature data with respect to the public key along with the public key, and wherein the mobile system further comprises a public key authenticating unit to verify the signature data to authenticate the public key.

6. The system of claim 5, wherein the signature data is generated by encrypting the public key using a private key in the service system, and the public key authenticating unit decrypts the signature data using the public key and compares the decrypted signature data with the public key to authenticate the public key.

7. A service system to perform authentication with a mobile system in which the mobile system and the service system output a result of the authentication, the service system comprising:
   a key generator to generate a public key and a private key pair;
   a public key transmitting unit to transmit the public key in response to a request from the mobile system;
   a hash value generating unit to generate a first hash value with respect to the public key, using a predetermined hash function; and
   an output device to output a first result corresponding to the first hash value,
   wherein a second hash value with respect to the public key of service system is generated in the mobile system and a second result corresponding to the second hash value is outputted in the mobile system, and
   the public key is authenticated by a user of the mobile system based on a comparison between the first result and the second result.

8. The service system of claim 7, wherein the output device comprises:
   a converting unit to convert the first hash value into text data according to a predetermined rule; and
   a display unit to display the converted text data.

9. The service system of claim 7, further comprising:
   an output-mode determining unit to determine an output-mode of the mobile system from among a plurality of output modes,
   wherein the output device outputs the first result according to the determined output-mode, and displays information on a display unit with respect to the output-mode of the mobile system.

10. The system of claim 7, further comprising:
    a session key receiving unit to receive an encrypted session key from the mobile system after ascertaining that an acknowledgment signal is inputted in response to the first result; and
    a decrypting unit to decrypt the encrypted session key using the private key.

11. The system of claim 7, further comprising:
    a signature data generating unit to generate signature data by encrypting the public key using the private key,
    wherein the public key transmitting unit transmits the signature data to the mobile system along with the public key.

12. The system of claim 11, wherein the public key is authenticated by comparing the public key with a decrypted signature data decrypted using the public key.

13. A method for authenticating a key using a mobile system and a service system in which the mobile system and the service system output a result of the authentication, the method comprising:
    receiving a public key from the service system;
    generating a first hash value with respect to the received public key, using a predetermined hash function; and
    outputting, by an output device, a first result corresponding to the first hash value,
    wherein a second hash value with respect to the public key of service system is generated in the service system and a second result corresponding to the second hash value is outputted in the service system, and
    the public key is authenticated by a user of the mobile system based on a comparison between the first result and the second result.

14. The method of claim 13, wherein the outputting of the first result comprises:
    converting the first hash value into text data according to a predetermined rule; and
    displaying the converted text data.

15. The method of claim 13, further comprising:
    determining an output-mode of the mobile system from among a plurality of output modes, wherein the outputting of the first result comprises displaying outputting the first result according to the determined output-mode, and information with respect to the output-mode of the service system.

16. The method of claim 13, further comprising:

generating a session key when an acknowledgment signal is inputted in response to the first result;

encrypting the session key using the public key; and transmitting the encrypted session key to the service system.

17. The method of claim 13, wherein the receiving of the public key comprises receiving a signature data with respect to the public key, and authenticating the public key by verifying the signature data.

18. The method of claim 17, wherein the signature data is generated by encrypting the public key using a private key in the service system, and the authenticating of the public key authenticates the public key by decrypting the signature data using the public key and comparing the public key with the decrypted signature data.

* * * * *